Jan. 27, 1925. 1,524,218
F. W. SMITH ET AL
SETTING DIAMONDS IN DIAMOND TOOLS
Filed Feb. 10, 1923
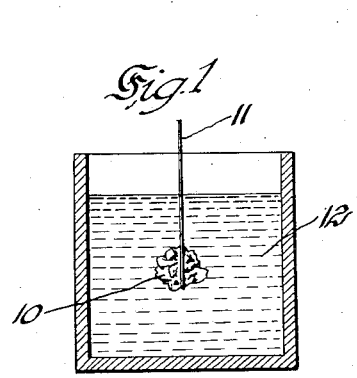
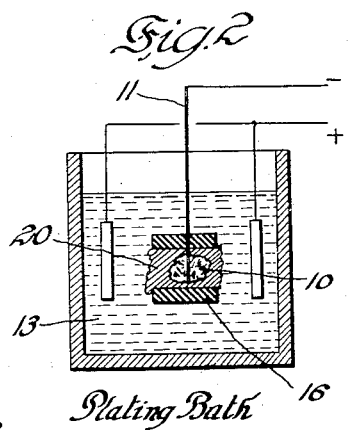
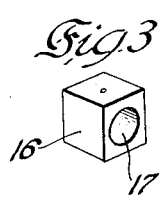
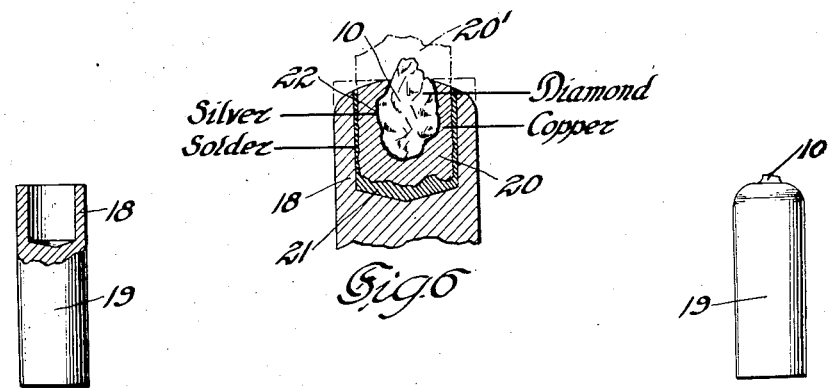

Patented Jan. 27, 1925.

1,524,218

UNITED STATES PATENT OFFICE.

FRED W. SMITH, OF HIGHLAND PARK, AND WILLIAM M. PHILLIPS, OF BIRMINGHAM, MICHIGAN.

SETTING DIAMONDS IN DIAMOND TOOLS.

Application filed February 10, 1923. Serial No. 618,278.

*To all whom it may concern:*

Be it known that we, FRED W. SMITH, a citizen of the United States, and a resident of Highland Park, county of Wayne, and State of Michigan, and WILLIAM M. PHILLIPS, a citizen of the United States, and a resident of Birmingham, county of Wayne, and State of Michigan, have invented certain new and useful Improvements in Setting Diamonds in Diamond Tools, of which the following is a full, clear, concise, and exact description, such as will enable others skilled in the art to which the invention relates to make and use the same, reference being made therein to the accompanying drawings, which form a part of this specification.

The invention relates to the mounting of objects of irregular form in holders or supports therefor, and more especially to the setting of diamonds in holders of the type employed for diamond tools. It is also applicable to the setting of gems.

The use of tools comprising diamonds or like mineral cutting elements for cutting, turning, drilling, or other operations on materials which by reason of their hardness or other peculiar properties are not readily worked with metal tools, is well known, for which use it is necessary to support the cutting element in a holder adapted to be held in the hand or set in a chuck or like machine part. Great difficulty has been encountered, however, in finding a satisfactory method of setting the diamonds in the holders, which latter are usually of metal, such as soft steel. One method commonly employed is to place the diamond in a recess in the holder of approximately the size of the diamond, and then to peen over the metal to engage and hold the stone. This is a very delicate operation requiring great skill and involving serious danger of breakage of the stone. Furthermore, it is quite impracticable with this method to obtain a firm and rigid support for the stone over its entire embedded area. Loosening in use and breakage under the strain imposed at the supporting points are likely to result.

Another method in general use is to support the diamond within a cavity in the holder and fuse around the diamond, or pour into the cavity in molten condition, sufficient brazing spelter, copper, or other metals to fill the space. This method affords a better support for the stone than the peening method, and permits ready removal for resetting. It is found impossible, however, in the setting of stones of very irregular contour to cause the spelter or other metal to contact with the entire surface of the stone because of the presence of blow holes and air pockets. As a result, the stone is likely to loosen in use, particularly under the intermittent strains incident to use in turning uneven surfaces of grinding wheels and like uses. Furthermore, the heat necessary to fuse the setting metal is believed to affect detrimentally the hardness of the stone, especially on the surface, and the strains due to unequal expansion and contraction develop cracks particularly along planes of cleavage.

In accordance with the present invention, we first embed the diamond without use of heat within a slug or coating closely adherent to and absolutely fitting the surface of the stone, and then set this slug in any suitable manner, as by the use of solder or spelter, in a holder of any desired character. The slug may be formed in a series of steps, including first the application to the stone of a conducting coating, and thereafter the further deposition of material, preferably by an electro-plating process. By this method we avoid the defects of the prior methods, as above pointed out, and secure particular advantages as more fully explained in the following description.

In the accompanying drawing illustrating certain features of the invention,

Figs. 1 and 2 are vertical sections illustrating respectively the step of applying a conducting coating to the diamond, and the step of electroplating the slug upon the diamond;

Fig. 3 is a perspective view of a rubber block which may be employed to predetermine the shape of the slug;

Figs. 4 and 5 are elevations, the former being partly in section, showing respectively a common form of holder and the completed tool with a diamond in position therein;

Fig. 6 is a partial longitudinal section through a diamond tool; and

Fig. 7 is a view of a diamond with an electroplated coating applied thereto, the latter being shown in section.

In practicing our invention, the following procedure may be followed:

A diamond, indicated at 10, supported by a flexible member, as a very fine wire 11, is immersed in a bath 12 of silvering material of a character similar to that ordinarily employed for silvering glass in the manufacture of mirrors and the like. The diamond may be first warmed to the desired degree by immersion in hot water. The purpose of this step is to provide upon the surface of the diamond a conducting coating which, in accordance with the procedure described, will be of silver. It will be understood, however, that other coats and other methods of application may be comprised within the scope of the invention, such, for example, as the use of graphite or bronze powder.

After the diamond has been sufficiently coated with the conducting material, it is immersed in plating bath 13, which may be and is preferably of a character adapted to deposit upon the diamond a body of hard copper. The electroplating operation may be continued until the deposited metal is sufficient to produce a slug of a size convenient for setting in the desired holder. If the diamond be suspended freely within the plating bath the form of the copper coating or slug, as indicated at 14 (Fig. 7), will be approximately the same as the contour of the diamond, following the irregularities of the surface thereof. This form of slug affords the advantage of indicating by its formation the location of the points of the diamond, and is therefore of assistance in so positioning the diamond in the holder that any desired point will be directed outwardly.

If desired, the plating may be prevented from covering certain predetermined areas of the diamond, as at one of the points, by applying to such areas a non-conducting coating, as of wax 15. This obviates the necessity of removal of the coating to expose the point.

For convenience in mounting the slug in a cylindrical or other regularly shaped recess, the slug may be made to assume a predetermined form by surrounding the diamond in the plating bath with a body 16, which may be of rubber or like non-conducting material, and in which is formed a cavity 17 of the form desired for the slug. If this cavity is made cylindrical, as illustrated, having its ends open to the plating bath, the plating operation will take place at the exposed areas of the slug and thus the latter will acquire an approximately cylindrical contour, as indicated at 20. A slug of such shape would be of especial convenience for mounting in a cylindrical recess in a holder such as is shown at 18 in the holder 19.

The mounting of the slug in the holder may be accomplished in any desired manner. Preferably the slug, as shown at 20, Fig. 6, is supported in proper position within the recess 18 to permit one point of the diamond to extend as desired beyond the end of the finished tool. It is then fixed in position by fusing into the space between the slug and the walls of the recess, or pouring thereinto, sufficient metal of lower melting point than the slug to completely fill the space. Such metal, indicated at 21, may be a solder or spelter. The end of the tool may then be suitably finished and the exposed end of the slug, as at 20', may be removed if the diamond point has not been kept free from metal, as above set forth.

The finished tool will then comprise the diamond 10, having a thin coating of conducting material as silver, indicated at 22, an enveloping slug of hard copper 20, and a retaining mass of fusible metal 21, all firmly and rigidly supported within the recess 18.

If at any time it is desired to reset the diamond, as when the exposed point has been worn to such an extent that the tool is no longer useful, it is only necessary to heat the tool end to the temperature required to fuse the retaining metal 21, whereupon the slug with the diamond still embedded therein will drop out of the recess. Resetting requires then simply the replacing of the slug in such position that a new point will be exposed. It will be noted that no great degree of skill or experience is required in the manipulation and mounting of the parts, and that the degree of heat applied to the surface of the diamond is very much less than with prior methods involving the use of fusible metal applied directly to the diamond. There is little danger, therefore, of any injury being caused to the diamond by strains due to expansion and contraction, and as a result diamonds of much poorer quality may be satisfactorily set and more completely used up than is possible with prior methods of setting them. Much greater economy is therefore possible not only in the labor required for setting the diamond but also in the cost of the diamonds employed inasmuch as diamonds of poorer quality, which are relatively inexpensive, may be made to give service almost if not entirely equal to that obtained with diamonds of higher quality with present methods of setting. Furthermore, the invention results in a material saving due to the elimination of breakage by the methods of setting now in general use.

The process is also applicable in the building up of a diamond of usable shape and size by combining two or more fragments which are too small to be individually useful in a diamond tool or which have been worn down in use. By assembling such fragmentary pieces and embedding them in metal in accordance with the present invention tion, a considerable saving may be effected. This process may be applied, for example, to stones which have been worn to a flat surface or those which have been split along cleavage planes. Two separate pieces may be coated, the coating removed to expose the flat surfaces, the pieces placed in contact, and a further coating applied to complete the slug. Points which alone would be too small or fragile for use in cutting may thus be assembled to form a tool in which the associated points will be practically usable.

It will be understood that various changes in details of procedure and materials may be made without departing from the spirit and scope of the invention, and therefore we do not wish to be restricted to the features herein specifically described except as required by the language of the appended claims in view of the prior art.

We claim:

1. The process of mounting a mineral body in a holder comprising electroplating upon said body exteriorly of the holder, a protecting and supporting slug and subsequently setting said slug rigidly in said holder.

2. The process of mounting a mineral body in a holder comprising the coating of the body with a thin layer of electrically conducting material, electroplating upon said layer exteriorly of said holder, a relatively thick layer of metal to form around the body a metallic slug, and subsequently setting said slug firmly in said holder.

3. In a process as set forth in claim 1, the predetermining of the form of the slug by limiting the deposition of metal to predetermined areas.

4. In a process as set forth in claim 1, the setting of the slug in the holder by means of a metallic body more easily fusible than the material of said slug.

5. The process of mounting a mineral body in a holder comprising electroplating upon the body a layer of metal to form a metallic slug, the deposition of metal upon predetermined areas of the body being prevented by providing upon said body corresponding non-conducting areas, and subsequently setting said slug and body rigidly in said holder.

6. In the process of setting a diamond or the like in a recess in a holder the formation of a slug of metal upon said diamond by electrodeposition exteriorly of the holder, predetermining the form of the slug by restricting the deposition to predetermined areas, and setting the slug and diamond as a unit rigidly in said recess.

7. An article of manufacture comprising a holder having a recess, a mineral body seated in said recess, a slug of metal in which said body is embedded, and readily fusible material surrounding said slug and fixing the same in said recess.

8. A diamond tool comprising a holder having a recess therein, a diamond having formed thereon a slug of metal of relatively high melting point, said slug seated in said recess, and retaining means for said slug comprising a body of metal of relatively low melting point.

9. A diamond tool comprising a holder having a recess therein, a diamond in said recess having a thin coating of silver and a thick covering of copper, and retaining means comprising a body of readily fusible alloy filling the space between the copper covering and the walls of the recess.

10. An article of manufacture comprising a holder having a recess therein, the holder forming enclosing walls for said recess substantially on all sides, but one, a mineral body having a slug of metal formed thereon said slug and body positioned in said recess and removable therefrom as a unit through the open side thereof, and means filling the recess around said slug and adapted to support the slug and mineral body rigidly from said holder.

11. A process of setting a mineral body such as a cutting diamond in a holder comprising electroplating upon said body a covering of substantial thickness adapted to constitute a material protecting and supporting means for said body, positioning said body and cover in a recess in the holder, and filling the recess with molten material.

12. A process of setting a diamond or the like in a holder comprising forming upon said diamond a protecting covering of substantially uniform thickness adapted to support the diamond rigidly, positioning said covering and diamond in a recess in said holder and securing them in such position by means permitting their removal as a unit for replacement or repair.

13. The process of mounting a cutting diamond or the like on a holder comprising embedding the diamond in a metallic slug of sufficient size to provide a material supporting and protecting body for the diamond, assembling said slug and holder and fixing the slug rigidly in assembled relation.

14. The process of mounting a cutting diamond or the like on a holder comprising embedding the diamond in a metallic slug of sufficient size to provide a material supporting and protecting body for the diamond, assembling said slug and holder and fixing the slug rigidly in assembled relation by means permitting the slug and diamond to be removed as a unit for replacement or repair.

In testimony whereof we affix our signatures.

FRED W. SMITH.
WILLIAM M. PHILLIPS.